US008545142B2

(12) United States Patent
Smith et al.

(10) Patent No.: US 8,545,142 B2
(45) Date of Patent: Oct. 1, 2013

(54) DEFORMATION MACHINING SYSTEMS AND METHODS

(75) Inventors: Kevin Scott Smith, Huntersville, NC (US); Bethany A. Woody, Charlotte, NC (US); John C. Ziegert, Seneca, SC (US); Jian Cao, Wilmette, IL (US)

(73) Assignees: University of North Carolina at Charlotte, Charlotte, NC (US); Clemson University, Clemson, SC (US); Northwestern University, Evanston, IL (US)

( * ) Notice: Subject to any disclaimer, the term of this patent is extended or adjusted under 35 U.S.C. 154(b) by 472 days.

(21) Appl. No.: 12/399,703

(22) Filed: Mar. 6, 2009

(65) Prior Publication Data
US 2009/0226272 A1 Sep. 10, 2009

Related U.S. Application Data

(60) Provisional application No. 61/034,209, filed on Mar. 6, 2008.

(51) Int. Cl.
*B23C 9/00* (2006.01)
*B23C 1/16* (2006.01)
*B21D 22/02* (2006.01)
*B21D 31/00* (2006.01)

(52) U.S. Cl.
USPC ................................ 409/80; 72/68; 72/379.2

(58) Field of Classification Search
None
See application file for complete search history.

(56) References Cited

U.S. PATENT DOCUMENTS 3,300,349 A * 1/1967 Tershin et al. ............... 216/102
6,159,315 A * 12/2000 Haszler et al. ............... 148/697

OTHER PUBLICATIONS

Jeswiet, Micari, Hirt, Bramley, Duflou, Allwood, "Asymmetric Single Point Incremental Forming of Sheet Metal," http:\\www.sciencedirect.com/science/article/pii/S0007850607600213, CIRP Annals, Manufacturing Technology, vol. 54, Issue 2, 2005, pp. 88-114.*
Bailey, Matt, "Laughter-Silvered Wings", CNC Machining, vol. 8, No. 29, pp. 20-29, spring 2004.*
Ahn, Plancarte, Wright, "The Impact of Reference Free Part Encapsulation (RFPE) on Design for Manufacturability with CNC Machining", Proceedings of the ASME International Design Engineering Technical Conference, Baltimore, MD, Septermber 10-13, 2000, pp. 1-9.*
Jeswiet, Micari, Hirt, Bramley, Duflou, Allwood, "Asymmetric Single Point Incremental Forming of Sheet Metal," http:\\www.sciencedirect.com/science/article/pii/S000785060700213, cirp aNNALS, mANUFACTURING tECNOLOGY, Vol. 54, Issue 2, 2005, pp. 88-114.*
Aijun, Zhanqiang, "Deformations of Thin-walled Plate due to Static End Milling Force", Journal of Materials Processing Technology, vol. 206, (2008), pp. 345-351.*

* cited by examiner

*Primary Examiner* — Kakali Chaki
*Assistant Examiner* — Walter Hanchak
(74) *Attorney, Agent, or Firm* — Clements Bernard PLLC; Christopher L. Bernard; Lawrence A. Baratta, Jr.

(57) ABSTRACT

The present invention relates generally to deformation machining systems and methods that combine, in a single machine tool setup, the machining of thin structures and single point incremental forming (SPIF), such that novel part geometries and enhanced material properties may be obtained that are not achievable using conventional machining or forming systems and methods, individually or collectively. Important to many applications, lighter weight parts may be produced at lower cost using a conventional 3-axis computer numerically controlled (CNC) machine tool or the like, instead of the conventional 5-axis CNC machine tool or the like that is typically required.

12 Claims, 7 Drawing Sheets

DEFORMATION MACHINING SYSTEMS AND METHODS

CROSS-REFERENCE TO RELATED APPLICATION(S)

The present non-provisional patent application claims the benefit of priority of U.S. Provisional Patent Application No. 61/034,209, filed on Mar. 6, 2008, and entitled "DEFORMATION MACHINING," the contents of which are incorporated in full by reference herein.

STATEMENT REGARDING FEDERALLY SPONSORED RESEARCH OR DEVELOPMENT

The U.S. Government has a paid up license in the present invention and the right, in limited circumstances, to require the patent owner to license to others on reasonable terms as provided for by the terms of Award No. DMI-0620032 awarded by the National Science Foundation.

NAMES OF PARTIES TO A JOINT RESEARCH AGREEMENT

The present invention was made by or on behalf of the University of North Carolina at Charlotte, Clemson University, and Northwestern University, which are/will be parties to a joint research agreement as an extension of a cooperation agreement related to deformation machining.

FIELD OF THE INVENTION

The present invention relates generally to deformation machining systems and methods that combine, in a single machine tool setup, the machining of thin structures and single point incremental forming (SPIF), such that novel part geometries and enhanced material properties may be obtained that are not achievable using conventional machining or forming systems and methods, individually or collectively. Important to many applications, lighter weight parts may be produced at lower cost using a conventional 3-axis computer numerically controlled (CNC) machine tool or the like, instead of the conventional 5-axis CNC machine tool or the like that is typically required.

BACKGROUND OF THE INVENTION

The machining (i.e. milling) of thin structures has been widely studied and described, and has enabled a revolution in the aerospace industry, the biomedical industry, and the electronics industry, among others. Components that were previously assembled from rolled sheet metal may now be manufactured as monolithic machined components. The improvement in precision and reduction in assembly cost has been dramatic, and such monolithic machined components are now in widespread use.

SPIF has enabled the creation of sheet metal parts without the use of dies, causing deformation at a local point. SPIF involves the use of a sheet metal blank held in a blank holder, with a single point forming tool used to locally deform the blank. The single point forming tool is controlled via computer. SPIF has provided flexibility in the creation of sheet metal parts with both symmetric and asymmetric geometries, in essentially any facility with a conventional 3-axis CNC machine tool or the like (having motion capability along three orthogonal axes). The ability to carry out dieless forming operations on the same type of machine tool used for machining operations provides the impetus for combining this process with the machining of thin structures.

What is still needed in the art, however, are processes that result in complex thin structures starting with plate stock or the like, without the need for a conventional 5-axis CNC machine tool or the like (having motion capability along three orthogonal axes and tilt capability in two directions) and without the use of rolled sheet metal. Preferably, a monolithic machined component is formed by a combination of machining and deformation, such that enhanced material properties and lighter weight are obtained at lower cost, among other advantages.

BRIEF SUMMARY OF THE INVENTION

In various exemplary embodiments, the present invention provides deformation machining systems and methods that combine, in a single machine tool setup, the machining of thin structures and SPIF, such that novel part geometries and enhanced material properties may be obtained that are not achievable using conventional machining or forming systems and methods, individually or collectively. Important to many applications, lighter weight parts may be produced at lower cost using a conventional 3-axis CNC machine tool or the like, instead of the conventional 5-axis CNC machine tool or the like that is typically required.

In one exemplary embodiment, the present invention provides a deformation machining method for manufacturing a structure from a piece of material, including: selectively machining the piece of material using a milling tool; and selectively forming the piece of material using a deformation tool; wherein one or more algorithms are used to control toolpaths of the milling tool and the deformation tool and a sequence in which each is used. Preferably, the milling tool is used to machine a thin structure from the piece of material. The deformation tool is subsequently used to form the thin structure. Optionally, the deformation tool is operated in a bending mode, being actuated substantially perpendicular to its primary axis and selectively bending a portion of the piece of material. Optionally, the deformation tool is operated in a stretching mode, being actuated substantially along its primary axis and selectively stretching a portion of the piece of material. The milling tool and deformation tool are alternately coupled to a 3-axis computer numerically controlled machine. The deformation tool is operated in one of a non-driven mode and a driven mode. Optionally, the method also includes selectively machining and forming the piece of material in order to control one or more of the material and mechanical properties of at least a portion of the structure.

In another exemplary embodiment, the present invention provides a deformation machining system for manufacturing a structure from a piece of material, including: a milling tool for selectively machining the piece of material; a deformation tool for selectively forming the piece of material; and one or more algorithms for controlling toolpaths of the milling tool and the deformation tool and a sequence in which each is used. Preferably, the milling tool is used to machine a thin structure from the piece of material. The deformation tool is subsequently used to form the thin structure. Optionally, the deformation tool is operated in a bending mode, being actuated substantially perpendicular to its primary axis and selectively bending a portion of the piece of material. Optionally, the deformation tool is operated in a stretching mode, being actuated substantially along its primary axis and selectively stretching a portion of the piece of material. The milling tool and deformation tool are alternately coupled to a 3-axis computer numerically controlled machine. The deformation tool is operated in one of a non-driven mode and a driven mode. Optionally, the system also includes means for selectively machining and forming the piece of material in order to control one or more of the material and mechanical properties of at least a portion of the structure.

In a further exemplary embodiment, the present invention provides a deformation machining method for manufacturing a structure from a piece of material, including: selectively machining a thin structure from the piece of material using a milling tool; and selectively forming the thin structure using a deformation tool; wherein one or more algorithms are used to control toolpaths of the milling tool and the deformation tool and a sequence in which each is used. Optionally, the deformation tool is operated in a bending mode, being actuated substantially perpendicular to its primary axis and selectively bending a portion of the thin structure. Optionally, the deformation tool is operated in a stretching mode, being actuated substantially along its primary axis and selectively stretching a portion of the thin structure. The method also includes selectively machining and forming the thin structure in order to control one or more of the material and mechanical properties of at least a portion of the thin structure.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

In general, there are two large classes of parts that are particularly relevant to the present invention, although this list is not intended to be exhaustive or limiting in any manner: 1) those where the primary deformation is perpendicular to the axis of the tool, resulting in a forming operation that involves the bending of a "wall" or "floor," and 2) those where the primary deformation is along the axis of the tool, resulting in a forming operation that involves the stretching of a "wall" or "floor." These parts may be large or small scale, and any machinable and formable materials may be used to manufacture them.

Figure 1A:
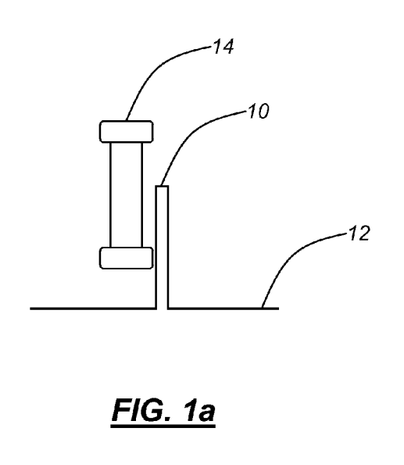
FIG. 1 is a series of schematic diagrams illustrating one exemplary embodiment of the deformation machining process of the present invention.
Figure 1B:
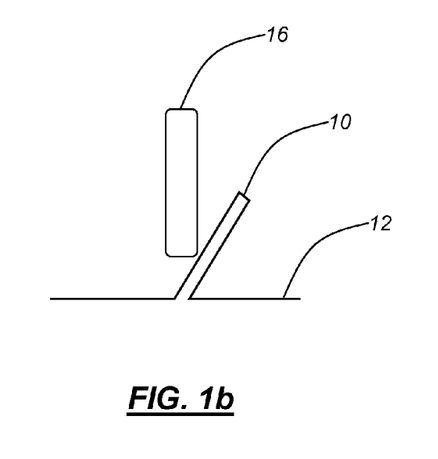
Figure 1C:
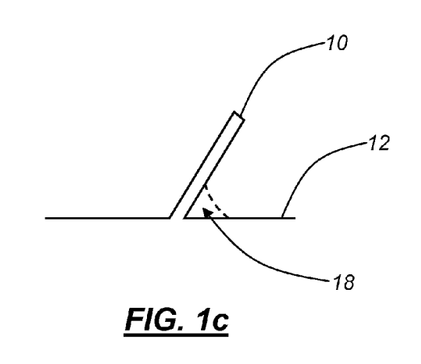

FIG. 1 illustrates conceptually the deformation machining of a thin wall 10 that is disposed at an angle to a floor 12, utilizing bending as the primary forming process (i.e. in a bending mode). For example, this type of structure is present in many beam-like ribs and webs in aerospace applications. Referring specifically to FIG. 1a, the thin wall 10 is first machined using a relieved shank tool 14 or the like. This machining progresses in layers from the top to the bottom, for example, and the thin wall 10 is machined to its finished dimension at each step. In this manner, the stiffness of the thin wall 10 is maintained while the machining occurs. Referring specifically to FIG. 1b, the milling tool 14 is replaced with a solid carbide rod with a corner radius or ball end 16 or the like, force is applied perpendicular to the axis of the deformation tool 16, and the thin wall 10 is plastically deformed. Referring specifically to FIG. 1c, advantageously, extra material 18 left at the intersection between the thin wall 10 and the floor 12 by conventional machining systems and methods is removed by the deformation machining systems and methods of the present invention, resulting in enormous weight savings in aerospace applications, for example. In order to remove this extra material 18 using conventional machining systems and methods, a 5-axis CNC machine tool or the like must be used, as well as milling tools of various refined geometries, greatly increasing the cost of such systems and methods. It will be readily apparent to those of ordinary skill in the art, that any milling tools 14 and deformation tools 16 may be used in conjunction with the deformation machining systems and methods of the present invention, and often relatively simple milling tools 14 and deformation tools 16 will suffice, as the machining and forming performed provide cooperative access to part material. Along these lines, any predetermined sequence of machining and forming may be used, as the manufacture of a given part dictates. Advantageously, the deformation machining systems and methods of the present invention necessitate the use of only a 3-axis CNC machine tool or the like. Typically, the spindle of this 3-axis CNC machine tool or the like is not locked, and may or may not be driven, depending upon the application.

It will be readily apparent to those of ordinary skill in the art that, in addition to the thin wall/floor structure illustrated and described above, the deformation machining systems and methods of the present invention may be used to form a wide range of simple and complex parts and structures utilizing bending as the primary forming process. For example, the deformation machining systems and methods of the present invention may be used to form a thin wall/thin wall structure, an array of intersecting or non-intersecting thin walls, a pin/floor structure, a pin/thin wall structure, an array of intersecting or non-intersecting pins, etc., with the possibilities being virtually endless. Likewise, any of these structures may be singly or multiply bent at any desired angle(s). For example, the thin wall/floor structure illustrated and described above may be bent to form any type of lip or overhang, a C-channel, a U-channel, or selectively and progressively bent along its transverse direction to form an impeller blade or the like. Again the possibilities are virtually endless.

The second large class of parts that may be manufactured using the deformation machining systems and methods of the present invention include those where the primary deformation is along the axis of the tool, resulting in a forming operation that involves the stretching of a "wall" or "floor."

Figure 2A:
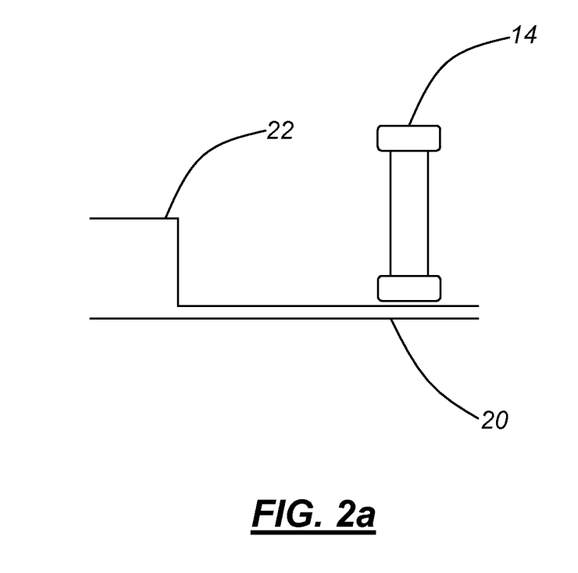
FIG. 2 is a series of schematic diagrams illustrating another exemplary embodiment of the deformation machining process of the present invention.
Figure 2B:
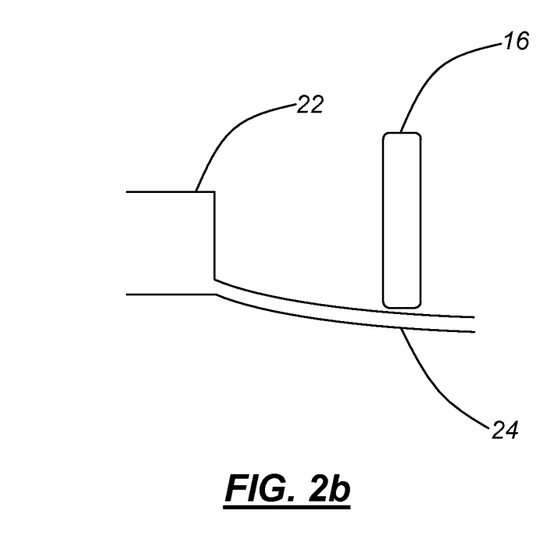

FIG. 2 illustrates conceptually the deformation machining of a thin domed floor 24, utilizing stretching as the primary forming process (i.e. in a stretching mode). This type of structure is useful in many common and exotic applications, such as bead strengthened I-beams, large surface area strengthened pressurized bulkheads, pressure relief valves, etc. Referring specifically to FIG. 2a, a thin floor 20 is first machined from a bulk material 22 using the milling tool 14. In this example, the thin floor 20 is supported at its periphery. Referring specifically to FIG. 2b, the thin floor 20 (FIG. 2a) is then stretched into a thin domed floor 24 using the deformation tool 16, with the primary force being applied along the axis of the deformation tool 16. Again, it will be readily apparent to those of ordinary skill in the art, that any milling tools 14 and deformation tools 16 may be used in conjunction with the deformation machining systems and methods of the present invention, and often relatively simple milling tools 14 and deformation tools 16 will suffice, as the machining and forming performed provide cooperative access to part material. Again, along these lines, any predetermined sequence of machining and forming may be used, as the manufacture of a given part dictates. Again, advantageously, the deformation machining systems and methods of the present invention necessitate the use of only a 3-axis CNC machine tool or the like. Typically, the spindle of this 3-axis CNC machine tool or the like is not locked, and may or may not be driven, depending upon the application.

It will be readily apparent to those of ordinary skill in the art that, in addition to the thin domed floor structure illustrated and described above, the deformation machining systems and methods of the present invention may be used to form a wide range of simple and complex parts and structures utilizing stretching as the primary forming process. The deformation machining systems and methods of the present invention may be used to form thin walls/floors with a variety of different shapes, with the possibilities being virtually endless. Previously or subsequently, any portion(s) of these structures may be machined and/or singly or multiply bent at any desired angle(s), as described above. Again the possibilities are virtually endless. One distinct advantage of the deformation machining systems and methods of the present invention is that they allow the fabrication of structures in which arbitrarily shaped thin sections are attached to arbitrarily shaped thick sections without the need for joining two separate components, thus resulting in stronger and more robust structures.

Advantageously, the deformation machining systems and methods of the present invention may be used to locally tailor the material properties of a part. For example, by carefully selecting the nature and sequence of the machining/forming process, desirable and synergistic morphologies and stresses may be established in the part—different grain structures may be created in the part, compressive stresses may be created in the surface of the part, etc. This may be used to control the mechanical properties of the part as a whole. Again, this is done using conventional equipment, in a minimal amount of time, and at a minimal cost.

Deformation Force Data and Experimental Results

Figure 3:
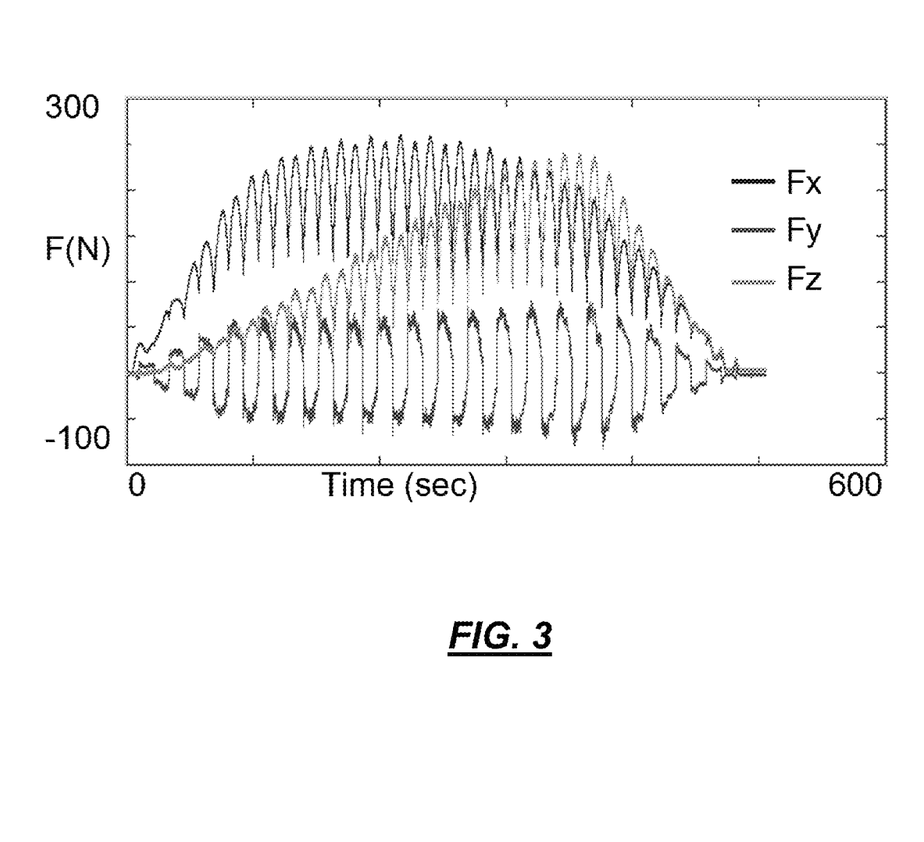
FIG. 3 is an experimental plot illustrating the deformation forces measured in the X, Y, and Z directions during the deformation of a thin wall.
Figure 4:
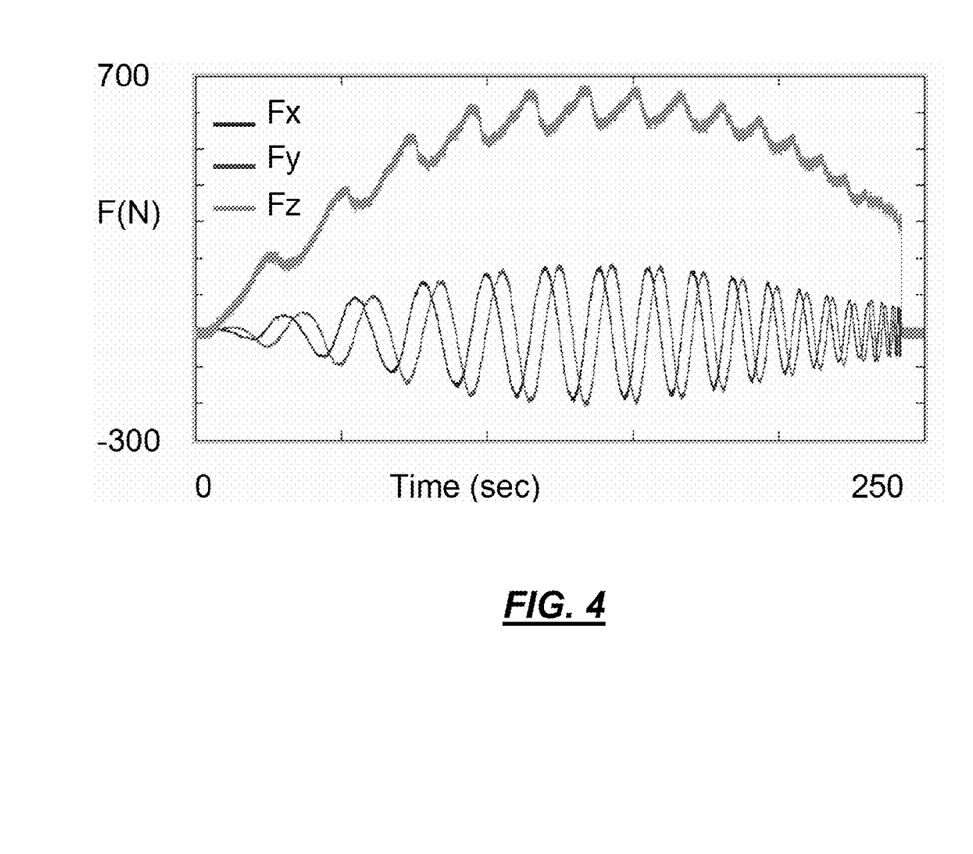
FIG. 4 is an experimental plot illustrating the deformation forces measured in the X, Y, and Z directions during the deformation of a thin floor.

Forces were measured during a deformation process for deformations perpendicular to the axis of the tool (i.e. bending) and for deformations along the axis of the tool (i.e. stretching). A thin wall component was mounted on top of a Kistler 9257b 3-direction dynamometer, which was connected to a Kistler 5010 amplifier. FIG. 3 illustrates the deformation forces measured in the X, Y, and Z directions during the deformation of a thin rectangular aluminum wall (25 mm high×50 mm long×1 mm thick). FIG. 4 illustrates the deformation forces measured in the X, Y, and Z directions during the deformation of a thin circular aluminum floor (50 mm diameter×0.5 mm thick). The material for all experiments was aerospace grade aluminum, Al 7050 T7451.

For the thin wall part, the wall was deformed through many passes of the tool. Referring to FIG. 3, the forces started largely in the X direction (perpendicular to the axis of the tool, as the tool moved along the wall surface). As the wall began to deform, the forces in the Z direction became larger. This is illustrated in FIG. 3 on the right, where it is clear that the tool made contact with the wall further down the radius of the ball. In all cases, the forces measured were well within the range of forces typically encountered in milling operations. Referring to FIG. 4, for the thin floor part, the forces along the axis of the tool were dominant, but again were in the range of forces typically encountered in milling operations. For these deformation operations, the tool was free to rotate, but was not driven to rotate, and no lubrication was used.

Typically, forming operations are performed on sheet metal that has material properties designed to enhance formability. However, in this case, Al 7050 T7451, a high strength aerospace grade aluminum that is stress relieved by stretching, was used. As a result, there were uncertainties regarding the material properties of sheets that have been machined from a bulk material and then formed. One specific question that arose is how the grain structure affects the bendability of the machined thin wall. As a result, force data was collected from identical thin walls machined from three different orientations within the plate stock, longitudinal (i.e. in the rolling and stress relief direction) and in both perpendicular directions (i.e. in the long transverse and short transverse directions). Forces were also recorded for each geometry at two different thicknesses, 1 mm and 0.5 mm, as shown in Table 1.

TABLE 1

Force Data in Newtons for Deformation Machining Under Different Conditions

|  | X-Max (N) | Y-Max (N) | Z-Max (N) |
|---|---|---|---|
| 0.5 mm Thickness |  |  |  |
| Circular Floor | 177.0 | 185.1 | 673.8 |
| Longitudinal Wall | 53.5 | 22.2 | 46.4 |
| Long Transverse Wall | 52.0 | 20.0 | 45.1 |
| Short Transverse Wall | 64.2 | 36.9 | 42.5 |
| 1 mm Thickness |  |  |  |
| Circular Floor | 429.7 | 433.6 | 1433.1 |
| Longitudinal Wall | 260.9 | 78.1 | 398.9 |
| Long Transverse Wall | 245.8 | 87.6 | 390.4 |
| Short Transverse Wall | 290.8 | 96.7 | 312.3 |

A finite element model of the deformation process was created for the thin wall. A static simulation was conducted by using the ABAQUS standard module. The thin wall and the adjacent base were meshed with the 20 nodes solid elements, while the rest of the part was meshed with the 8 nodes solid element. There were a total of 11950 hexahedral elements and 34590 nodes in the model. The NC file from the actual experiment was imposed into the simulation to move the forming tool.

Figure 5:
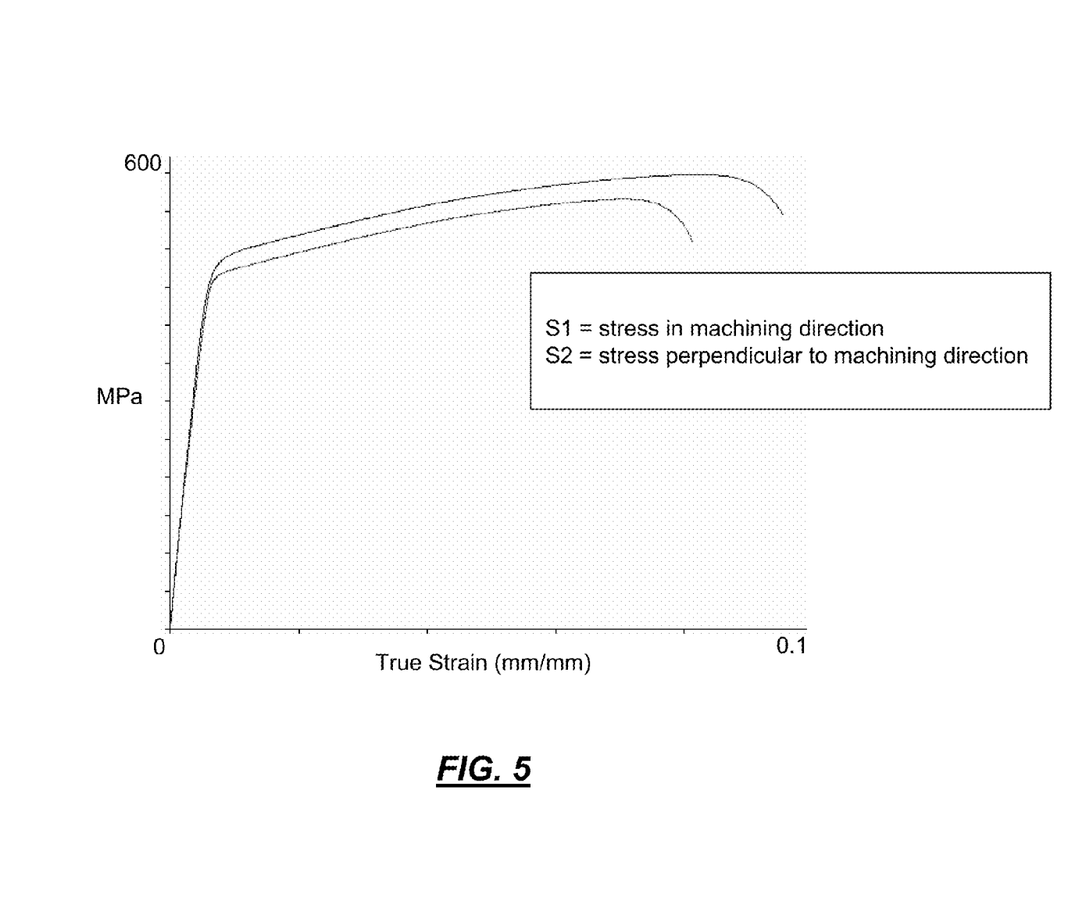
FIG. 5 is an experimental plot illustrating the results of two tensile tests, the top one in the direction of machining, and the bottom one perpendicular to the direction of machining.

A uniaxial tensile test was conducted to experimentally determine the material properties for input into the simulation. The blank used in the uniaxial testing was obtained with the same machining process and the same material as that in the experiment. FIG. 5 illustrates the results of two tensile tests, the top one in the direction of machining, and the bottom one perpendicular to the direction of machining.

Figure 6:
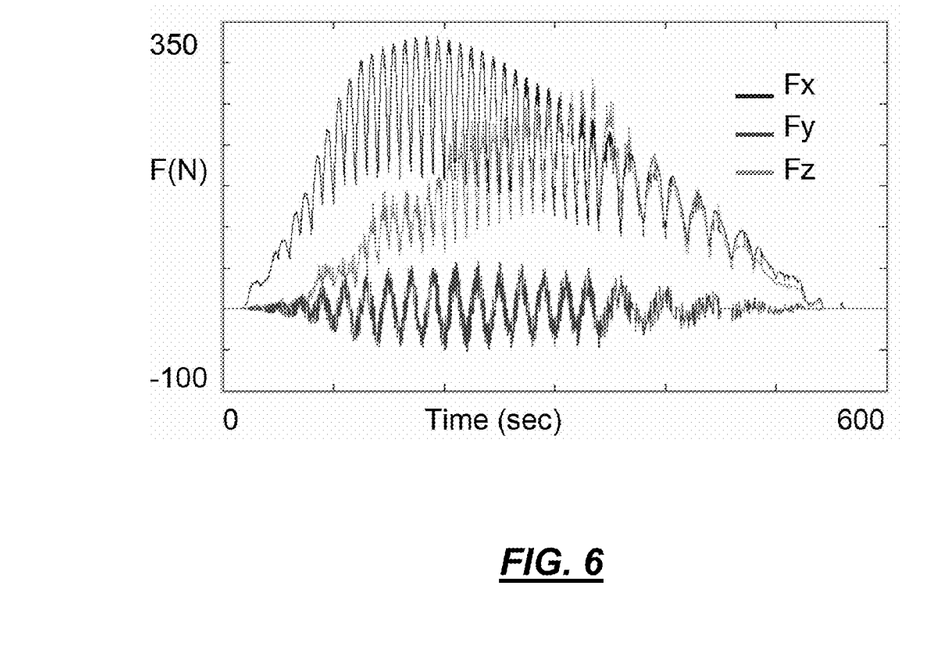
FIG. 6 is an experimental plot illustrating forces calculated using a finite element simulation.

The material parameters used in the simulation were an initial yield stress of 469.7 MPa, a Young's modulus of 70.0 Gpa, and a Poisson's ratio 0.33. FIG. 6 illustrates the forces calculated using this model. The forces calculated using the finite element simulation were qualitatively similar to the measured forces (i.e. they had the same general shape and order of magnitude), but there was some discrepancy in the maximum values between the measured force and the simulated force. The maximum force from the measured data ranged between 245 and 290 N (depending on the part orientation within the stock, as shown in Table 1) and the simulations yielded a maximum force of about 335 N. There are a variety of factors that may have contributed to this difference in maximum force including: 1) the material property or constitutive material model used in the simulation, 2) there may have been a softening effect, fatigue effect, or microcracking occurring during the deformation, and 3) friction effects between the tool and workpiece.

For example, in the model, the tool was assumed to roll on the surface of the workpiece without slipping, but during the experiments it was observed that sometimes the tool slid along the surface, and sometimes it rolled along the surface of the workpiece. This provided the impetus to use the friction between the tool and the workpiece to affect the forces in or the condition of the workpiece. Rather than allowing the tool to be free to rotate, the tool may be driven to roll on the surface, held to slide on the surface, or driven at a much different speed to generate localized heating. Because the friction condition affects the forming force, it is possible to use the friction to facilitate the deformation, to affect the grain structure, to modify the residual stresses, or to make other beneficial changes.

Figure 7:
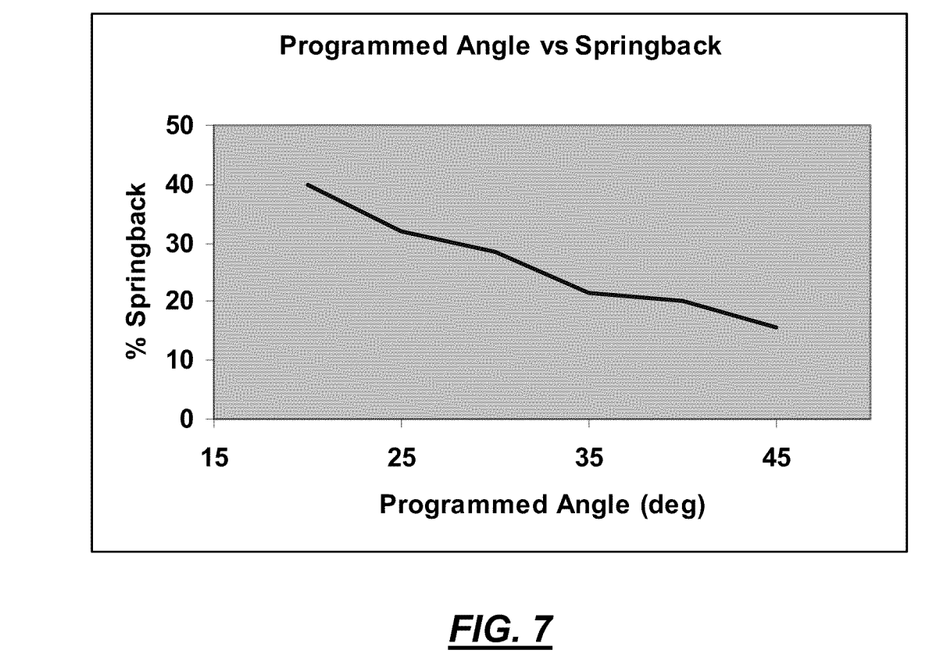
FIG. 7 is an experimental plot illustrating the percent of springback versus the angle a wall is bent to for one given configuration and set of conditions used to evaluate the deformation machining systems and methods of the present invention.

Another set of experiments were performed to test process parameters, including: toolpath formation, part geometry, spindle speed, lubrication, and forming direction with respect to stock rolling direction. The machine used for these experiments was a HAAS TM-1 3-axis CNC milling machine programmed using Mastercam software. The forming tool used was a 0.5 in diameter carbide rod with a ball end. The lubrication used was general purpose lithium grease. The toolpath used was designed to bend a thin wall. The toolpath consisted of incremental arcs that traveled along the width of the wall and pushed the outside edges slightly further than the center. This compensated for the higher amounts of springback at these edges. Each arc was connected by another arc that allowed for smooth transitions to each increment. A set of thin walls were made to evaluate springback and cracking for a given part geometry ranging from 20° up to 45° in increments of 5°. The wall thickness was 0.04 in and the wall height was 0.85 in. A linear curve fit was fit to the data. This fit was then used to predict what angle a wall should be programmed in order to achieve a desired angle. For a final desired angle of 30° the next part was formed with a programmed wall angle of 38.9°, which yielded an actual final angle of 30.9°. This was then fine tuned and a programmed angle of 38° yielded the desired final angle of 30°. FIG. 7 illustrates the percent of springback versus the angle the wall was bent to.

Overall, twenty walls were created using deformation machining to test the various process parameters. The results from these experiments included:

Bending with the axis in the short transverse direction provided the least amount of cracking.

Pushing walls higher up the wall resulted in more springback.

Lubrication provided a better surface finish along surfaces of the walls.

Greater angles resulted in less springback.

A final angle could be predicted and produced using previous results.

Spinning the forming tool while pushing close to the base of the wall produced unwanted deformation (e.g. the wall conforming to the shape of the tool).

Two cracked floors were formed differently with respect to grain direction. Different spindle speeds were used to machine the floors for each direction. A ball end indenter was then pushed into the center of the pocket floor until material failure occurred while the indenter force and position were recorded. These experiments showed that the material rolling direction had a significant effect on the formability of the part. When the primary grain direction was normal to the plane of the material being deformed, the maximum force prior to failure increased by approximately 40% to 50%, although the maximum deflection at failure increased by only approximately 10% to 15%. For the specimens with the primary grain direction lying in the plane of the material, all failures were along the grain direction; while the specimens with grain direction normal to the surface showed a more random pattern of failure. No significant difference was found in either forming force or maximum deflection when the thin section was machined at different speeds.

In separate experiments, twenty other floors were made to test process parameters. The toolpaths were created in Mastercam by drawing 3-D helixes (i.e. conical shapes) or 2-D spirals and using the ramp option (i.e. a dome shape) to reach the desired forming depth. The results found from deformation machining these twenty floors included:

Fewer cracks resulted when pushing in the short transverse direction.

Spinning the tool helped to decrease cracking, while providing varying surface finishes as a result of part geometry.

Too high of a spindle speed caused unwanted thermal deformation.

Lubrication increased surface finish quality while forming with a free spinning spindle.

Cracking formed as a result of varying the geometry at similar forming depths.

In general, deformation machining is a novel hybrid manufacturing process that combines thin part machining with SPIF. Starting from plate stock, thin features (walls, floors, or even pins) are created by machining operations. Then, using a forming tool, SPIF is used to create deformations of the thin sections in two different ways, by bending the features or by stretching them. By switching between the cutting tool and the deformation tool, it is possible to make interesting features that are thinner, lighter, and/or less expensive than the structures they replace. In addition, it is possible to produce geometries that are difficult or impossible to create using other processes. Force data collected demonstrates that this process is within the capability of existing machine tools (i.e. the measured deformation forces are similar in magnitude to cutting forces). Preliminary simulations demonstrate similar trends.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A deformation machining method for manufacturing a structure from a piece of material, comprising: securing a piece of material to a 3-axis computer numerically controlled machine; coupling a milling tool or deformation tool to the 3-axis computer numerically controlled machine; after coupling the milling tool or deformation tool to the 3-axis computer numerically controlled machine, working the piece of material with the coupled tool, thereby creating a milled part or a deformed part; after working the piece of material with the coupled tool, subsequently coupling the other tool of the milling tool or deformation tool to the 3-axis computer numerically controlled machine; and after subsequently coupling the other tool to the 3-axis computer numerically controlled machine, subsequently working the milled part or the deformed part with the subsequently coupled tool, thereby creating a part that is both milled and deformed, wherein the steps of working the piece of material, subsequently coupling the other tool, and subsequently working the piece of material are performed after securing the piece of material to the 3-axis computer numerically controlled machine and without releasing the piece of material from the 3-axis computer numerically controlled machine.

2. The deformation machining method of claim 1, wherein the milling tool is used to machine a thin structure from the piece of material.

3. The deformation machining method of claim 2, wherein the deformation tool is subsequently used to form the thin structure.

4. The deformation machining method of claim 1, wherein the deformation tool is operated in a bending mode, being actuated substantially perpendicular to its primary axis and selectively bending a portion of the piece of material.

5. The deformation machining method of claim 1, wherein the deformation tool is operated in a stretching mode, being actuated substantially along its primary axis and selectively stretching a portion of the piece of material.

6. The deformation machining method of claim 1, wherein the deformation tool is operated in one of a non-driven mode and a driven mode.

7. The deformation machining method of claim 1, further comprising selectively machining and forming the piece of material in order to control one or more of the material and mechanical properties of at least a portion of the structure.

8. A deformation machining method for manufacturing a structure from a piece of material, comprising: securing a piece of material to a 3-axis computer numerically controlled machine; while the piece of material is secured to the 3-axis computer numerically controlled machine, selectively machining a thin structure from the piece of material using a milling tool coupled to the 3-axis computer numerically controlled machine; and while the piece of material is still secured to the 3-axis computer numerically controlled machine, selectively forming the thin structure using a deformation tool coupled to the 3-axis computer numerically controlled machine, thereby creating a thin structure that has been cooperatively machined and formed to generate a part.

9. The deformation machining method of claim 8, wherein the deformation tool is operated in a bending mode, being actuated substantially perpendicular to its primary axis and selectively bending a portion of the thin structure.

10. The deformation machining method of claim 8, wherein the deformation tool is operated in a stretching mode, being actuated substantially along its primary axis and selectively stretching a portion of the thin structure.

11. The deformation machining method of claim 8, wherein the deformation tool is operated in one of a non-driven mode and a driven mode.

12. The deformation machining method of claim 8, further comprising selectively machining and forming the thin structure in order to control one or more of the material and mechanical properties of at least a portion of the thin structure.

* * * * *